United States Patent [19]
Jan

[11] Patent Number: 5,713,107
[45] Date of Patent: Feb. 3, 1998

[54] FASTENING BELT

[76] Inventor: I-hwu Jan, No. 102, Sec. 2, Chienkuo S. Rd., Taichung, Taiwan

[21] Appl. No.: 745,275

[22] Filed: Nov. 8, 1996

[51] Int. Cl.$^6$ .................................................. B65D 63/00
[52] U.S. Cl. .................................. 24/20 CW; 24/20 EE; 24/23 EE
[58] Field of Search ................. 24/20 CW, 20 EE, 24/23 EE, 23 W

[56] References Cited

U.S. PATENT DOCUMENTS

| | | | |
|---|---|---|---|
| 3,235,925 | 2/1966 | Gerhardt et al. | 24/23 EE |
| 5,105,509 | 4/1992 | Lilley | 24/20 CW |
| 5,305,499 | 4/1994 | Oetiker | 24/20 CW |

FOREIGN PATENT DOCUMENTS 0977757  12/1964  United Kingdom ............ 24/20 CW

*Primary Examiner*—Victor N. Sakran
*Attorney, Agent, or Firm*—Gunn, Lee & Miller, P.C.

[57] ABSTRACT

A fastening belt includes a first end, a second end, a first side and a second side. A corrugation extends from the first side thereof near the first end and a plurality of holes are defined in the fastening belt near the second end. A plurality of teeth extends from the second side of the fastening belt and are located between the corrugation and the second end such that the first end of the fastening belt is utilized by overlapping the first end thereof on the second end thereof with the teeth inserted into the holes corresponding thereto.

2 Claims, 8 Drawing Sheets

FASTENING BELT

BACKGROUND OF THE INVENTION

1. Field of the Invention

The present invention relates to a fastening belt and more particularly, to an improved fastening belt for securely fastening each one of two ends of a dust sleeve used on a universal joint.

2. Brief Description of the Prior Art

Referring to FIG. 1, a universal joint (not shown) is used to connect a pair of propeller shafts 50 so as to provide a variety of directions for torque forces being transmitted. In order to prevent the parts of the universal joint from being affected by dust etc entering between the parts, a dust sleeve 60 is used to mount around the universal joint and grease is filled between the universal joint and the dust sleeve 60. The dust sleeve 60 is securely fixed to the pair of propeller shafts 50 by two fastening belts 61. Further referring to FIGS. 2 and 3 which show a first type of conventional fastening belt 30 which is made of a metal strip and has two ends which are connected by welding at point 31 so as to form a ring-shaped configuration. An extending portion 33 has one end thereof fixedly connected to one of two ends of the fastening belt 30 and a U-shaped member 32 is fixedly disposed to the fastening belt 30 with two protrusions 321 extending radially from the fastening belt 30. The dust sleeve 60 has both ends thereof respectively received between the propeller shafts 50 and the fastening belts 30 and the extending portion 33 is fixedly clamped by folding the two protrusions 321 downwardly. However, this type of the fastening belt 30 has a fixed shape and a fixed size which cannot satisfy the needs of different uses. Furthermore, such ring-shaped fastening belts 30 occupy too much space and therefore are not easy to be packed or shipped.

FIGS. 4 and 5 show a second type of fastening belt 40 which has a first end and a second end, the first end thereof having a corrugation 41 which is pressed from the fastening belt 40 and a plurality of holes 43 defined therein, the second end of the fastening belt 40 has a plurality of teeth 42, 420 integrally extending inclinedly therefrom wherein the teeth 420 are located near the second end of the fastening belt 40. When wrapping the dust sleeve 60 round a proprell or shaft as shown in FIG. 1, some of the teeth 42 are inserted into the holes 43 corresponding thereto and the second end of the fastening belt 40 is overlapped beneath the fastening belt 40 such that a gap "A" is defined between the teeth 420 and an under side of the fastening belt 40 as shown in FIG. 5. The corrugation 41 is then be clipped from both ends thereof to pull the first end of the fastening belt 40 to ensure the teeth 42 are inserted into the holes 43. However, when the universal joint is operated, a force will press the second end of the fastening belt 40 outwardly and radially and the teeth 420 could be pressed downwardly by the under side of the fastening belt 40 such that the gap "A" is therefore reduced and the second end of the fastening belt 40 is then pushed toward the under side of the fastening belt 40 and another gap is defined between the dust sleeve 60 and the second end of the fastening belt 40. Furthermore, the teeth 42, 420 could hurt a user's hands (not shown).

The present invention intends to provide an improved fastening belt to mitigate and/or obviate the above-mentioned problems.

SUMMARY OF THE INVENTION

The present invention provides a fastening belt which includes a first end, a second end, a first side and a second side. The fastening belt has a corrugation extending from the first side thereof near the first end and a plurality of holes are defined in the fastening belt near the second end. A plurality of teeth extend from the second side of the fastening belt and are located between the corrugation and the second end such that when the first end overlaps on the second end, the teeth insert into the holes corresponding thereto.

It is an object of the present invention to provide a fastening belt which ensures a secure clamping function between the fastening belt and the dust sleeve.

It is another object of the present invention to provide a fastening belt which is easily used without the possibility of injury to a user's hands.

Other objects, advantages, and novel features of the invention will become more apparent from the following detailed description when taken in conjunction with the accompanying drawings.

DETAILED DESCRIPTION OF THE PREFERRED EMBODIMENT

Figure 6:
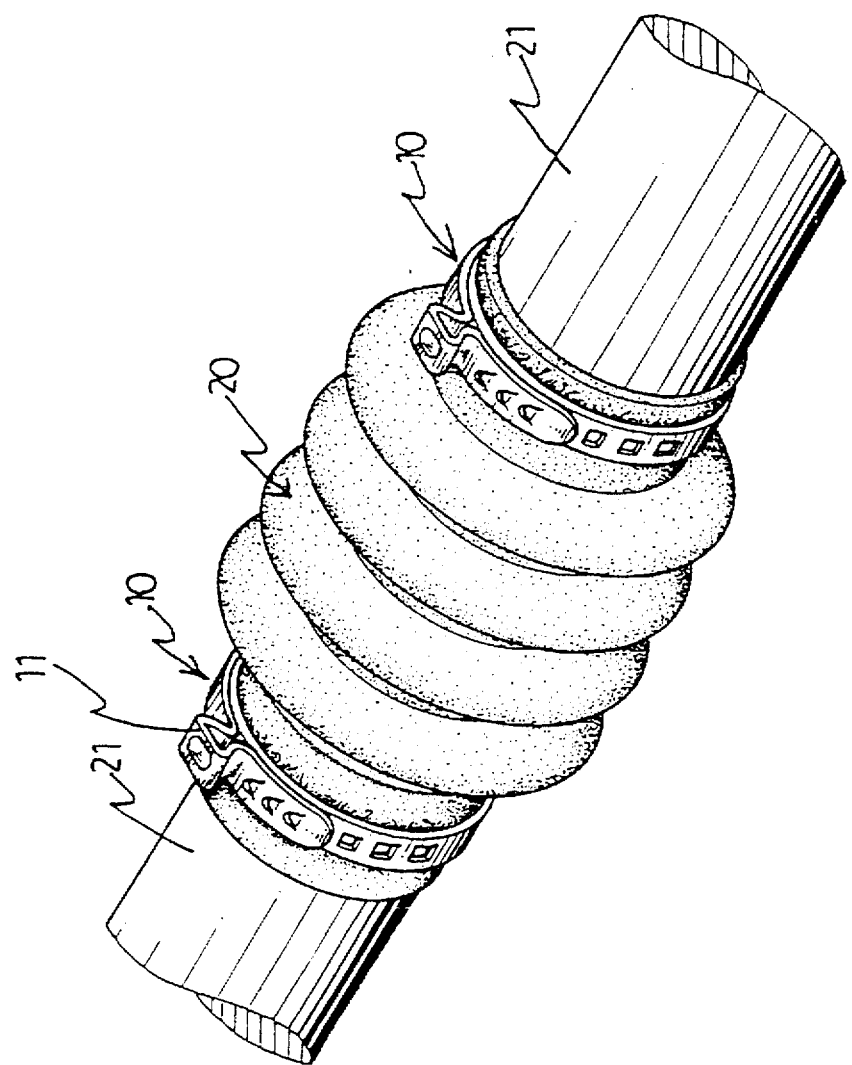
FIG. 6 is a perspective view of two fastening belts in accordance with the present invention wrapped around two ends of a dust sleeve which is disposed to connect two propeller shafts.
Figure 7:
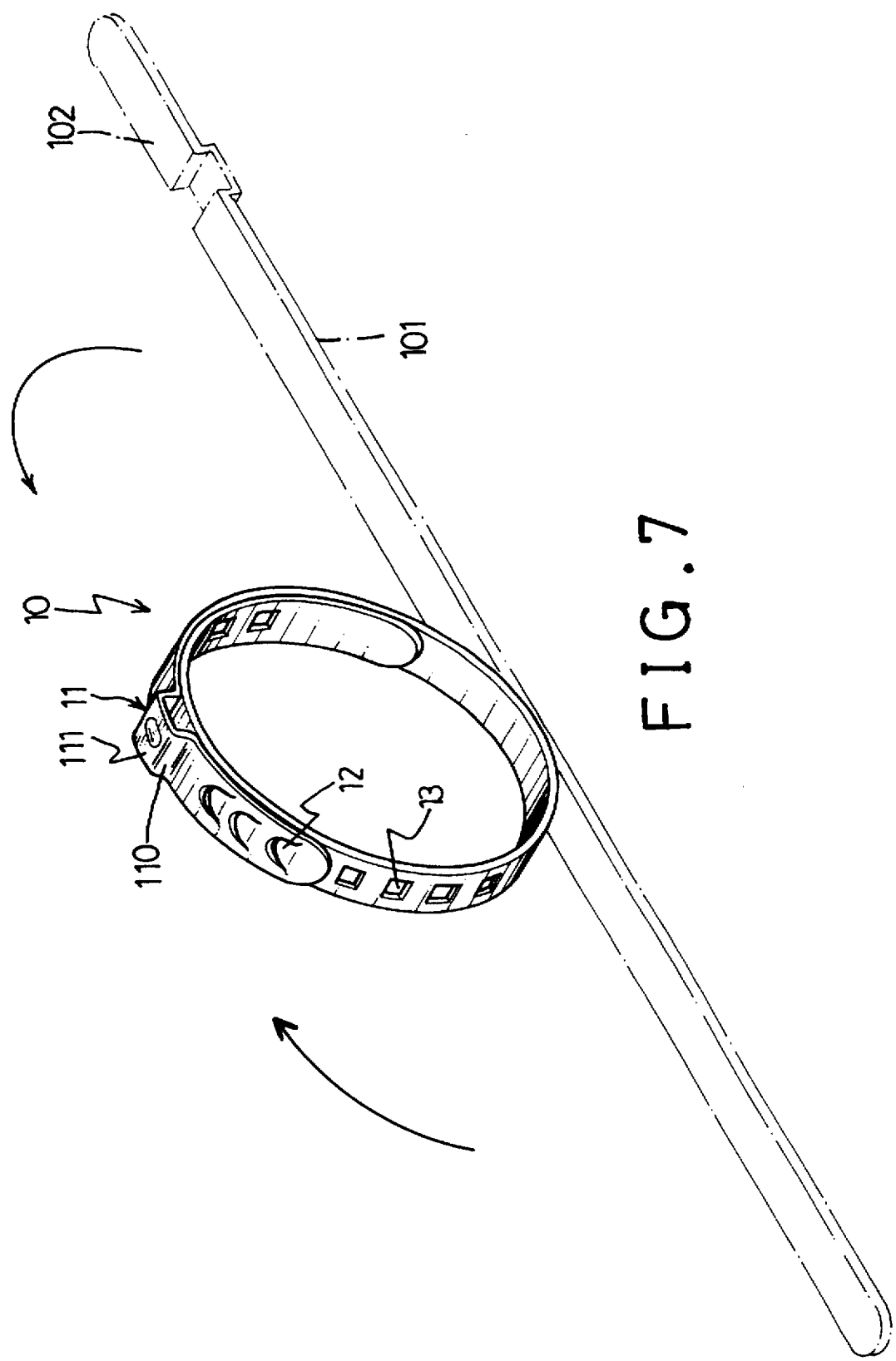
FIG. 7 is a perspective view of the fastening belt in accordance with the present invention wherein the phantom lines shows the fastening belt in an unused status.
Figure 8:
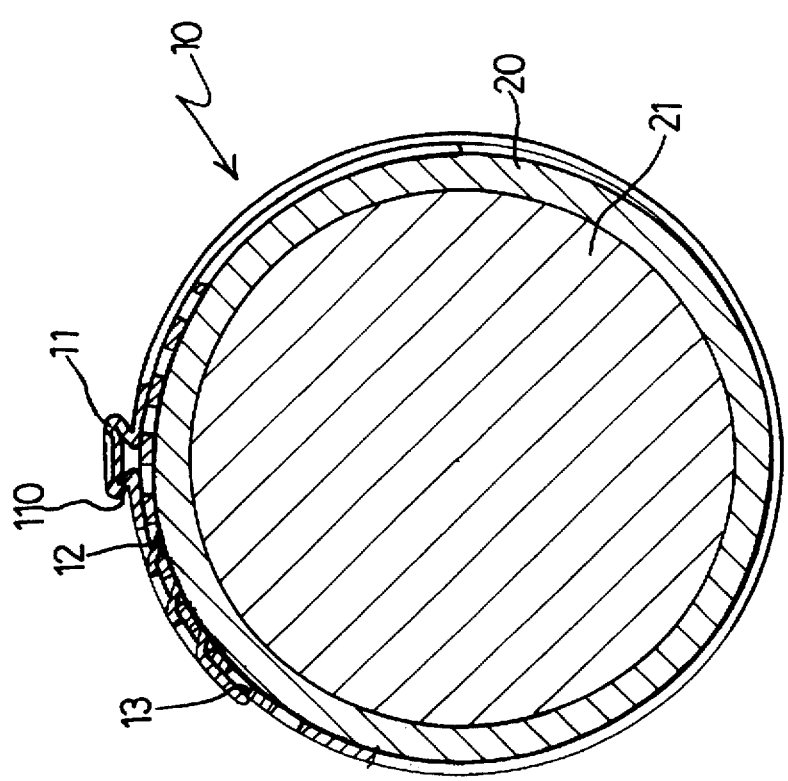
FIG. 8 is an end elevational view, partly in section, of the fastening belt wrapped around the dust sleeve which is mounted on the propeller shaft.

Referring to FIG. 6, a dust sleeve 20 is disposed to connect two propeller shafts 21 wherein a universal joint (not shown) is received in the dust sleeve 20 which has each one of two ends thereof be fixedly connected to the propeller shaft 21 corresponding thereto by a fastening belt 10 in accordance with the present invention. Referring to FIGS. 7 and 8, the fastening belt 10 in accordance with the present invention generally is a longitudinal strip and includes a first end, a second end, a first side 101 and a second side 102. The fastening belt 10 has a corrugation 11 integrally extending from the first side 101 thereof near the first end wherein the corrugation 11 is formed by two end walls 110 and a top 111 integrally formed between the two end walls 110 which are integrally folded perpendicularly from the first side 101 of the fastening belt 10. A plurality of holes 13 are defined in the fastening belt 10 near the second end and a plurality of teeth 12 extend integrally and inclinedly from the second side 102 of the fastening belt 10 wherein the teeth 12 are located between the second end of the fastening belt 10 and the corrugation 11.

In use, the fastening belt 10 is wrapped around the corresponding one of two ends of the dust sleeve 20 with the second end of the fastening belt 10 overlapped beneath the first end of the fastening belt 10 such that the first side 101 of the second end contacts the second side 102 of the first end. The teeth 12 are inserted into the holes 13 corresponding thereto so that the fastening belt 10 wraps around the dust sleeve 20 tightly. The two end walls 110 of the corrugation 11 are then clamped toward with each other to pull the first end of the fastening belt 10 to make the teeth 12 extend through the holes 13 corresponding thereto such that the fastening belt 10 is fixedly wrapped around the dust sleeve 20.

Figure 1:
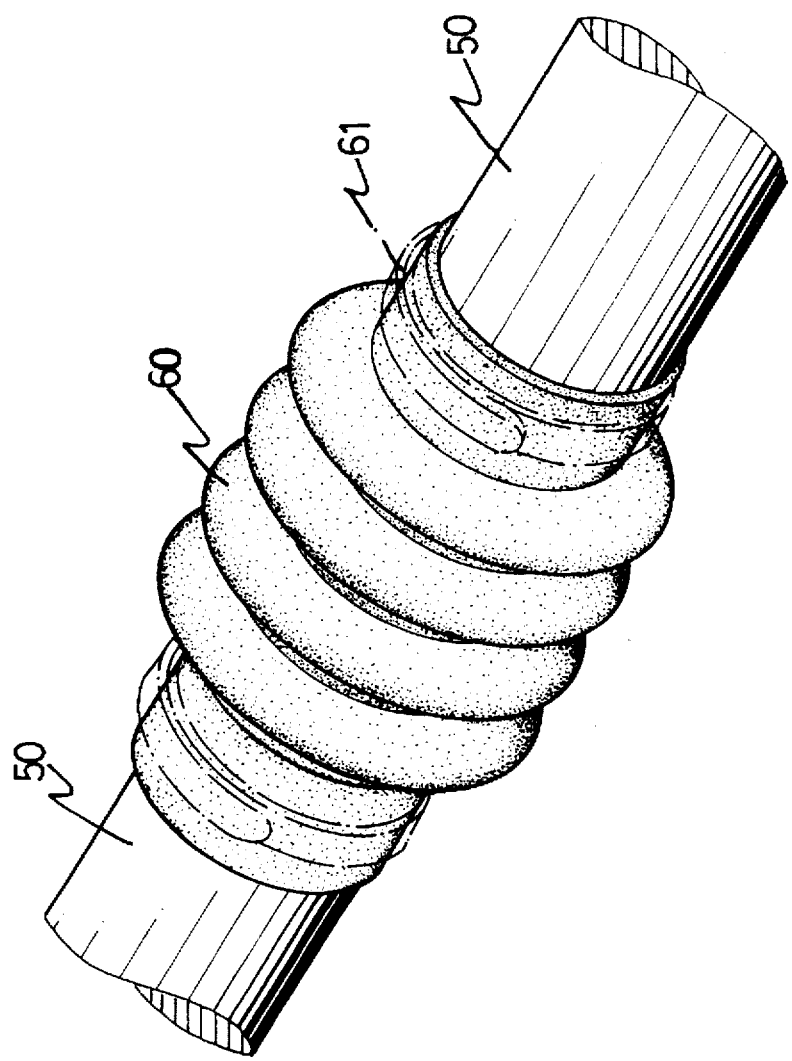
FIG. 1 is a perspective view of two conventional fastening belts, shown in phantom lines, wrapped around two ends of a dust sleeve which is disposed to connect two propeller shafts.
Figure 2:
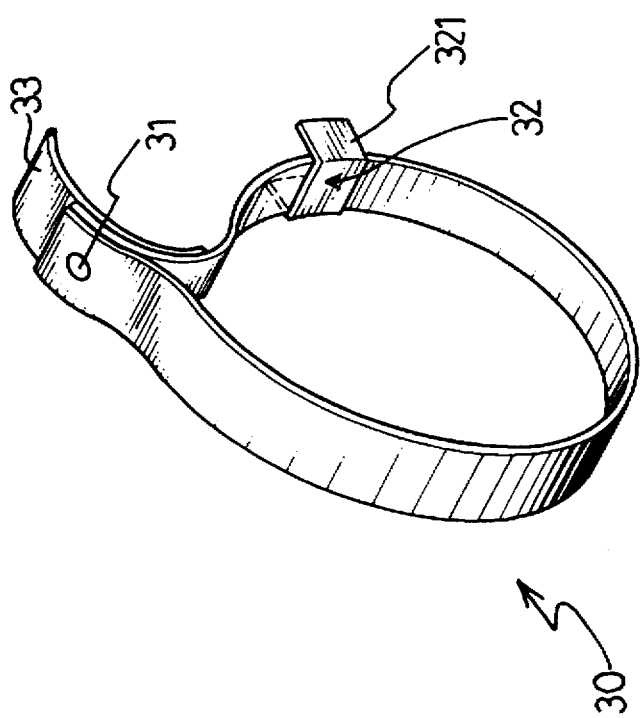
FIG. 2 a perspective view of a first type of conventional fastening belt.
Figure 3:
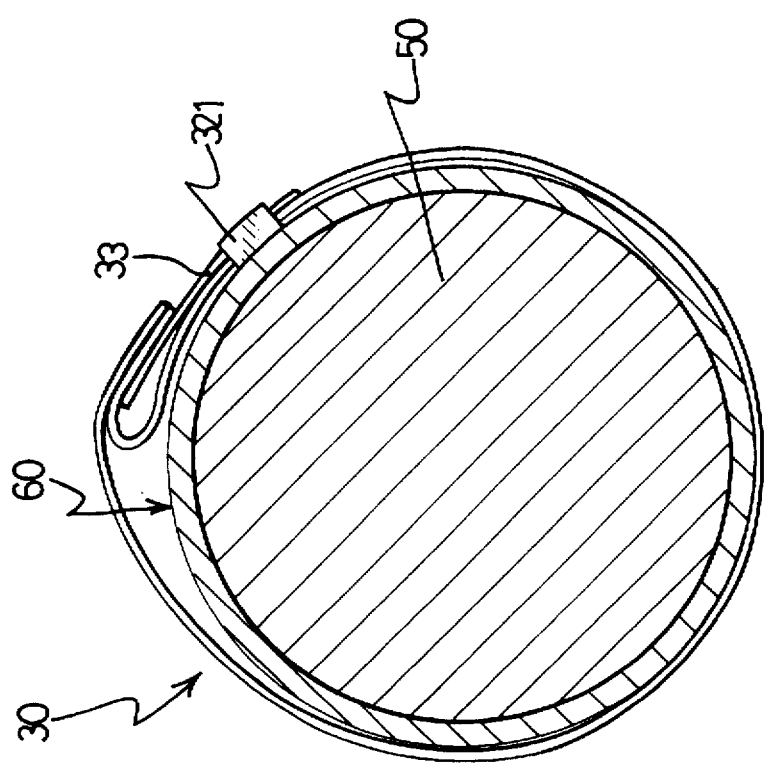
FIG. 3 is an end elevational view, partly in section, of the first type of conventional fastening belt wrapped on the dust sleeve which is mounted on the propeller shaft.
Figure 4:
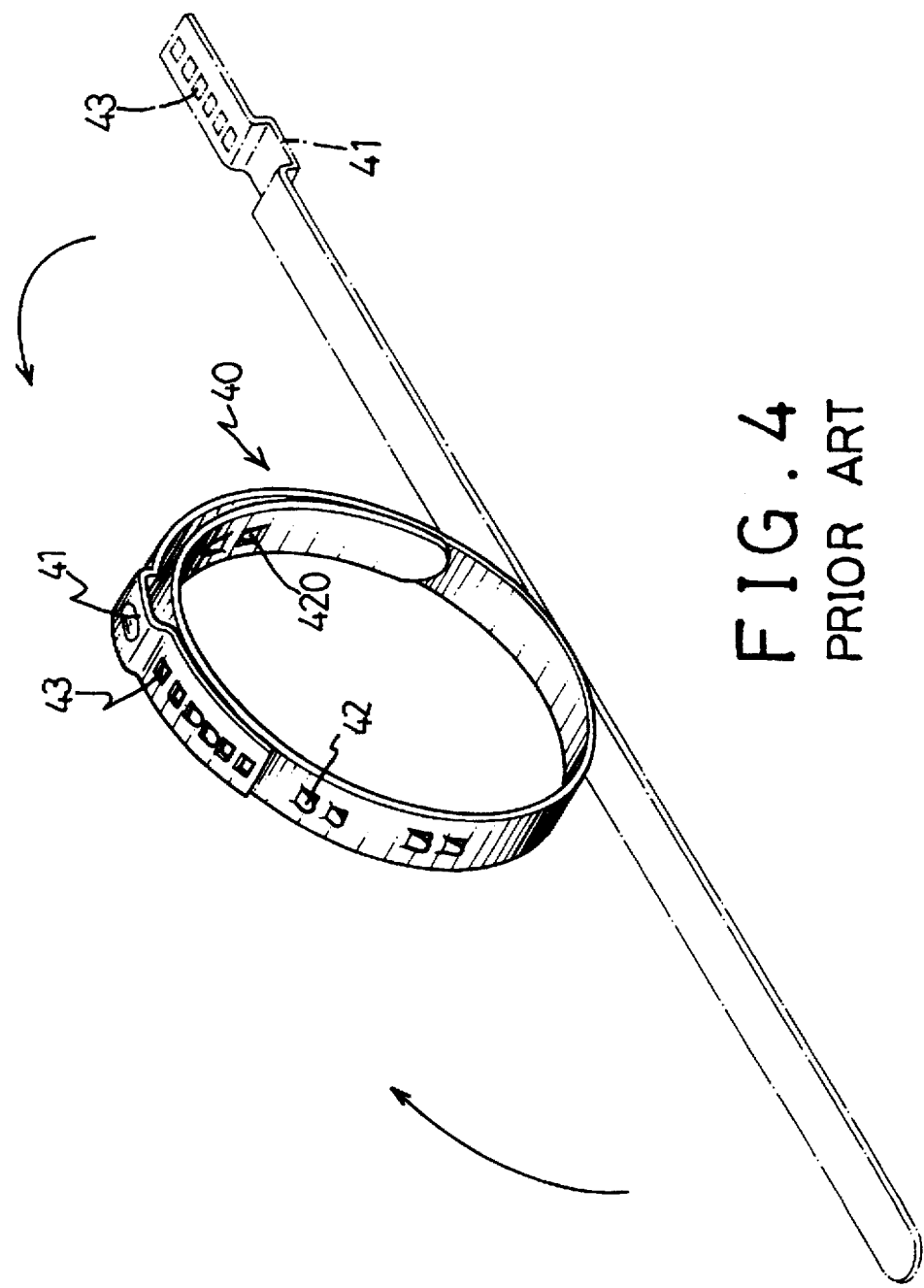
FIG. 4 is a perspective view of a second type of conventional fastening belt wherein the phantom lines shows the fastening belt in an unused status.
Figure 5:
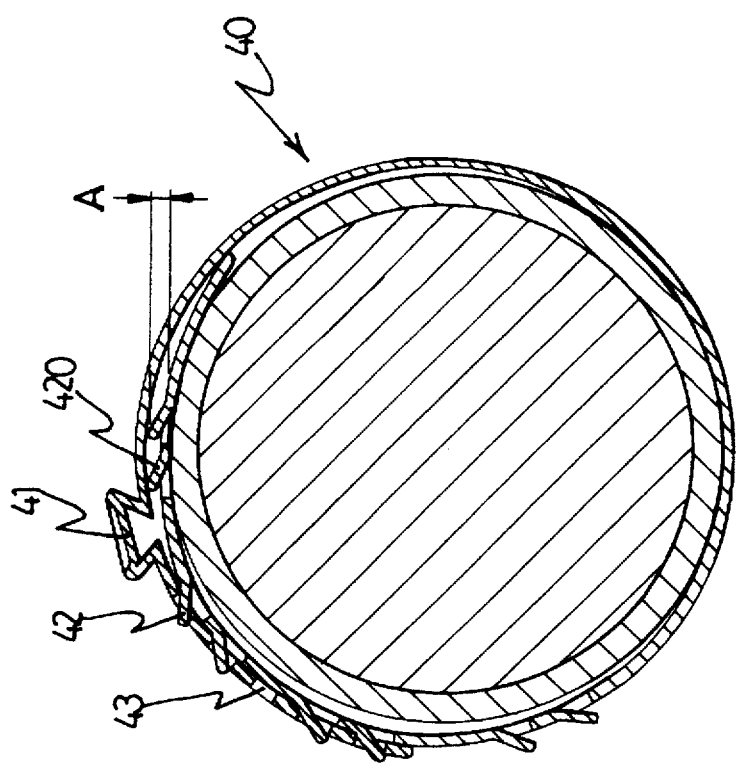
FIG. 5 is an end elevational view, partly in section, of the second type of conventional fastening belt wrapped around the dust sleeve which is mounted on the propeller shaft.

Accordingly, the fastening belt 10 in accordance with the present invention is easily used and because the teeth 12 extend from the second side 102, they will not hurt a user's hand (not shown). Furthermore, because the teeth 12 and the corrugation 11 are located on the first end of the fastening belt 10, there will be no gap as shown in the prior art of FIG. 5 defined between the fastening belt 10 and the dust sleeve 20 when in use.

Although the invention has been explained in relation to its preferred embodiment, it is to be understood that many other possible modifications and variations can be made without departing from the spirit and scope of the invention as hereinafter claimed.

What is claimed is:

1. A fastening belt comprising a first end, a second end, a first side and a second side, said fastening belt having a corrugation extending outwardly from and toward said first side thereof near said first end and a plurality of holes defined in said fastening belt near said second end, a plurality of teeth extending outwardly from and toward said second side of said fastening belt and located between said corrugation and said second end, a portion of said first side of said second end of said fastening overlapping beneath said second side of said first end of said fastening belt when said belt is fastened.

2. The fastening belt as claimed in claim 1 wherein said teeth extend integrally and inclinedly from said second side of said fastening belt.

* * * * *